United States Patent
Matsunaga et al.

(10) Patent No.: US 12,024,205 B2
(45) Date of Patent: Jul. 2, 2024

(54) CONTROL DEVICE AND CONTROL METHOD FOR DISABLING AN AUTOMATED DRIVING FUNCTION

(71) Applicant: HONDA MOTOR CO., LTD., Tokyo (JP)

(72) Inventors: Hideki Matsunaga, Wako (JP); Toshiaki Takano, Tokyo (JP); Satoshi Onodera, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 408 days.

(21) Appl. No.: 17/481,952

(22) Filed: Sep. 22, 2021

(65) Prior Publication Data

US 2022/0011768 A1 Jan. 13, 2022

Related U.S. Application Data

(63) Continuation of application No. PCT/JP2019/014309, filed on Mar. 29, 2019.

(51) Int. Cl.
*B60W 60/00* (2020.01)
*B60W 40/08* (2012.01)
(Continued)

(52) U.S. Cl.
CPC .......... *B60W 60/005* (2020.02); *B60W 40/08* (2013.01); *B60W 60/0018* (2020.02);
(Continued)

(58) Field of Classification Search
CPC .... B60W 60/005; B60W 40/08; B60W 50/14; B60W 60/0018; B60W 2040/0836;
(Continued)

(56) References Cited

U.S. PATENT DOCUMENTS 10,759,424 B2   9/2020   Misu et al.
11,027,748 B2   6/2021   Odate et al.
(Continued)

FOREIGN PATENT DOCUMENTS

CN   108883773 A    11/2018
JP   2009-037415 A   2/2009
(Continued)

OTHER PUBLICATIONS

International Search Report and Written Opinion for PCT/JP2019/014309 mailed Jul. 2, 2019.
(Continued)

*Primary Examiner* — Ian Jen
*Assistant Examiner* — Karston G. Evans
(74) *Attorney, Agent, or Firm* — Thomas| Horstemeyer, LLP

(57) ABSTRACT

A control device of a vehicle including an automated traveling unit capable of executing automated traveling functions includes an acquisition unit for acquiring information regarding a use state of a remote driving service for the vehicle, and a control unit for determining a content of the automated traveling function to be executable by the automated traveling unit based on the use state of the remote driving service for the vehicle. In a case where the vehicle is not using the remote driving service, the control unit disables at least some of the automated traveling functions that are executable in a case where the vehicle is using the remote driving service.

13 Claims, 8 Drawing Sheets

(51) Int. Cl.
*G05D 1/00* (2024.01)
*B60W 50/14* (2020.01)

(52) U.S. Cl.
CPC ... *G05D 1/0011* (2013.01); *B60W 2040/0836* (2013.01); *B60W 50/14* (2013.01); *G05D 1/0016* (2013.01)

(58) Field of Classification Search
CPC ......... B60W 60/0016; B60W 2540/24; B60W 50/12; B60W 60/0054; G05D 1/0011; G05D 1/0016; G05D 2201/0213; G05D 1/0055; B60K 28/06; G08G 1/09; G08G 1/16

See application file for complete search history.

(56) References Cited

U.S. PATENT DOCUMENTS

| | | | |
|---|---|---|---|
| 11,046,332 | B2 | 6/2021 | Akaba et al. |
| 11,188,074 | B1* | 11/2021 | Benavidez ............ G05D 1/0044 |
| 2017/0334458 | A1* | 11/2017 | Sato .................. B60W 60/0059 |
| 2018/0015828 | A1* | 1/2018 | Mcnew ................. B60W 50/14 |
| 2018/0050696 | A1 | 2/2018 | Misu et al. |
| 2018/0136651 | A1* | 5/2018 | Levinson ............... B60W 30/00 |
| 2018/0196427 | A1* | 7/2018 | Majumdar ......... B60W 60/0059 |
| 2019/0056729 | A1* | 2/2019 | Ferguson ............. G07F 17/0057 |
| 2019/0092346 | A1 | 3/2019 | Odate et al. |
| 2019/0212732 | A1 | 7/2019 | Takanashi et al. |
| 2019/0339692 | A1* | 11/2019 | Sakai ................... G05D 1/0027 |
| 2020/0047773 | A1 | 2/2020 | Akaba et al. |
| 2021/0116907 | A1* | 4/2021 | Altman .................... H04Q 9/00 |
| 2021/0163021 | A1* | 6/2021 | Frazzoli ................. B60W 50/02 |
| 2023/0311901 | A1* | 10/2023 | Chan .................... G05D 1/0061 340/576 |

FOREIGN PATENT DOCUMENTS

| | | |
|---|---|---|
| JP | 2016-018238 A | 2/2016 |
| WO | 2018/034781 A1 | 2/2018 |
| WO | 2018/037945 A1 | 3/2018 |
| WO | 2018/087828 A1 | 5/2018 |
| WO | 2020/202380 A1 | 10/2020 |

OTHER PUBLICATIONS

Chinese Office Action for Chinese Patent Application No. 201980094023.4 mailed Jun. 6, 2023.

* cited by examiner

| AUTOMATED TRAVELING FUNCTION | USING REMOTE DRIVING SERVICE | NOT USING REMOTE DRIVING SERVICE |
|---|---|---|
| AUTOMATED DRIVING LEVEL 5 | VALID | INVALID |
| AUTOMATED DRIVING LEVEL 4+ | VALID | INVALID |
| AUTOMATED DRIVING LEVEL 4 | VALID | VALID |
| AUTOMATED DRIVING LEVEL 3 | VALID | VALID |
| LANE CHANGE | VALID | VALID |
| FOLLOWING TRAVELING | VALID | VALID |

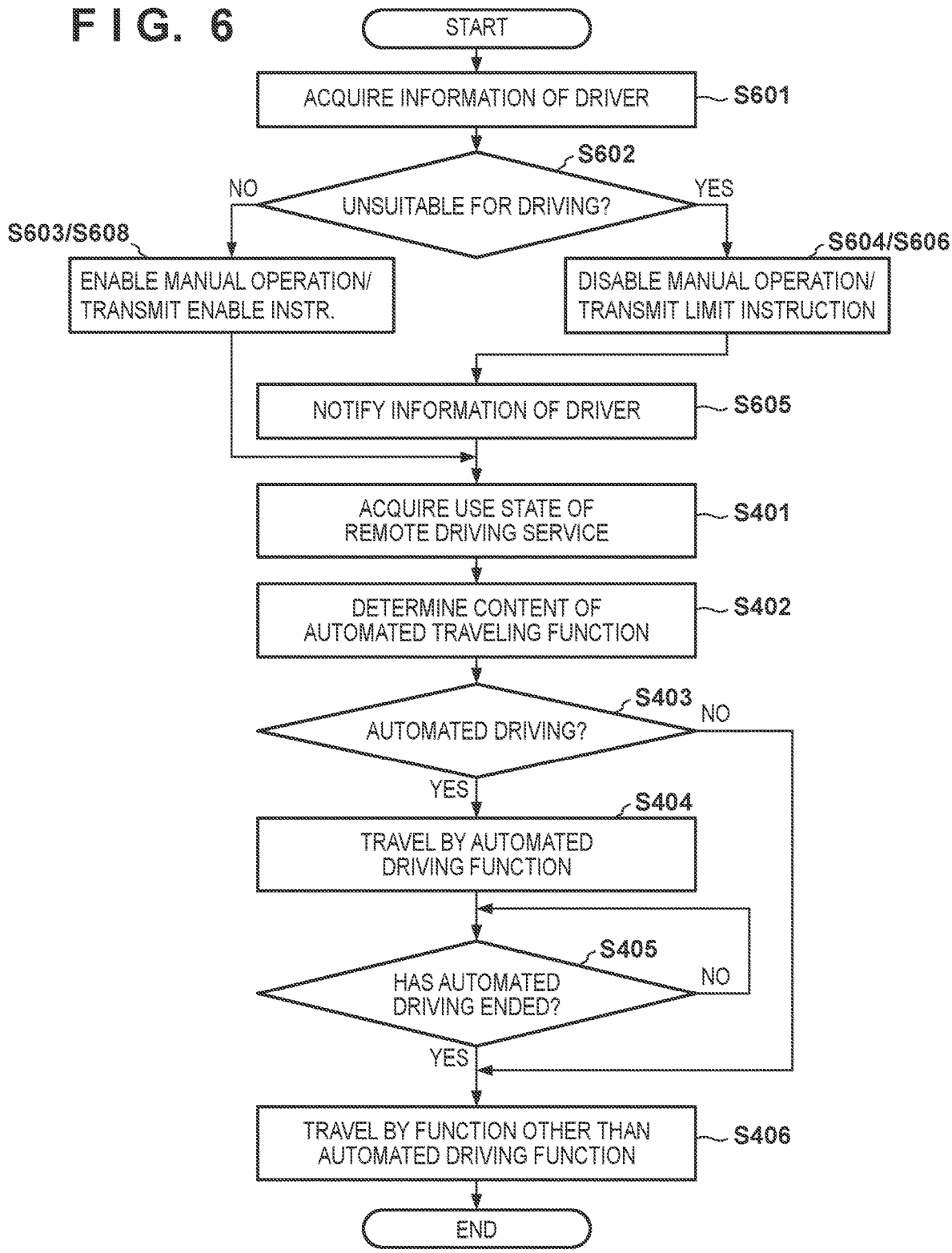

FIG. 7

| 701 AUTOMATED TRAVELING FUNCTION | 702 DRIVER SUITABLE AND USING REMOTE DRIVING SERVICE | 703 DRIVER UNSUITABLE AND USING REMOTE DRIVING SERVICE | 704 DRIVER SUITABLE AND NOT USING REMOTE DRIVING SERVICE | 705 DRIVER UNSUITABLE AND NOT USING REMOTE DRIVING SERVICE |
|---|---|---|---|---|
| AUTOMATED DRIVING LEVEL 5 | VALID | VALID OR INVALID | INVALID | INVALID |
| AUTOMATED DRIVING LEVEL 4+ | VALID | VALID | INVALID | INVALID |
| AUTOMATED DRIVING LEVEL 4 | VALID | VALID | VALID | INVALID |
| AUTOMATED DRIVING LEVEL 3 | VALID | VALID | VALID | INVALID |
| LANE CHANGE | VALID | VALID | VALID | INVALID |
| FOLLOWING TRAVELING | VALID | VALID | VALID | INVALID |

CONTROL DEVICE AND CONTROL METHOD FOR DISABLING AN AUTOMATED DRIVING FUNCTION

CROSS-REFERENCE TO RELATED APPLICATION(S)

This application is a continuation of International Patent Application No. PCT/JP2019/014309 filed on Mar. 29, 2019, the entire disclosures of which is incorporated herein by reference.

BACKGROUND OF THE INVENTION

Field of the Invention

The present disclosure relates to a control device and a control method.

Description of the Related Art

Various technologies for reducing accidents caused by drunk driving have been proposed. Japanese Patent Laid-Open No. 2009-37415 proposes a vehicle that detects that a driver is in a drunk state and performs a control according to the detection. Specifically, when the driver is in a drunk state, the vehicle switches from manual driving to automated driving and is urgently stopped.

SUMMARY OF THE INVENTION

In a case where the driver is in a state unsuitable for a driving operation such as a drunk state, the driver cannot appropriately support an automated traveling function, and thus it is appropriate to limit the vehicle as compared with a case where the driver is in a normal state. However, similarly limiting the automated traveling function even when an operation subject other than the driver can appropriately support the automated traveling function may be considered excessive. Some aspects of the present disclosure provide a technology for appropriately limiting an automated traveling function of a vehicle.

In an embodiment, provided is a control device of a vehicle including an automated traveling unit capable of executing automated traveling functions, the control device including: an acquisition unit for acquiring information regarding a use state of a remote driving service for the vehicle; and a control unit fort determining a content of the automated traveling function to be executable by the automated traveling unit based on the use state of the remote driving service for the vehicle, in which in a case where the vehicle is not using the remote driving service, the control unit disables at least some of the automated traveling functions that are executable in a case where the vehicle is using the remote driving service.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 6 is a flowchart for describing an example of another control method according to the embodiment.

FIG. 7 is a diagram for describing an example of another function determination table according to the embodiment.

DESCRIPTION OF THE EMBODIMENTS

Figure 1:
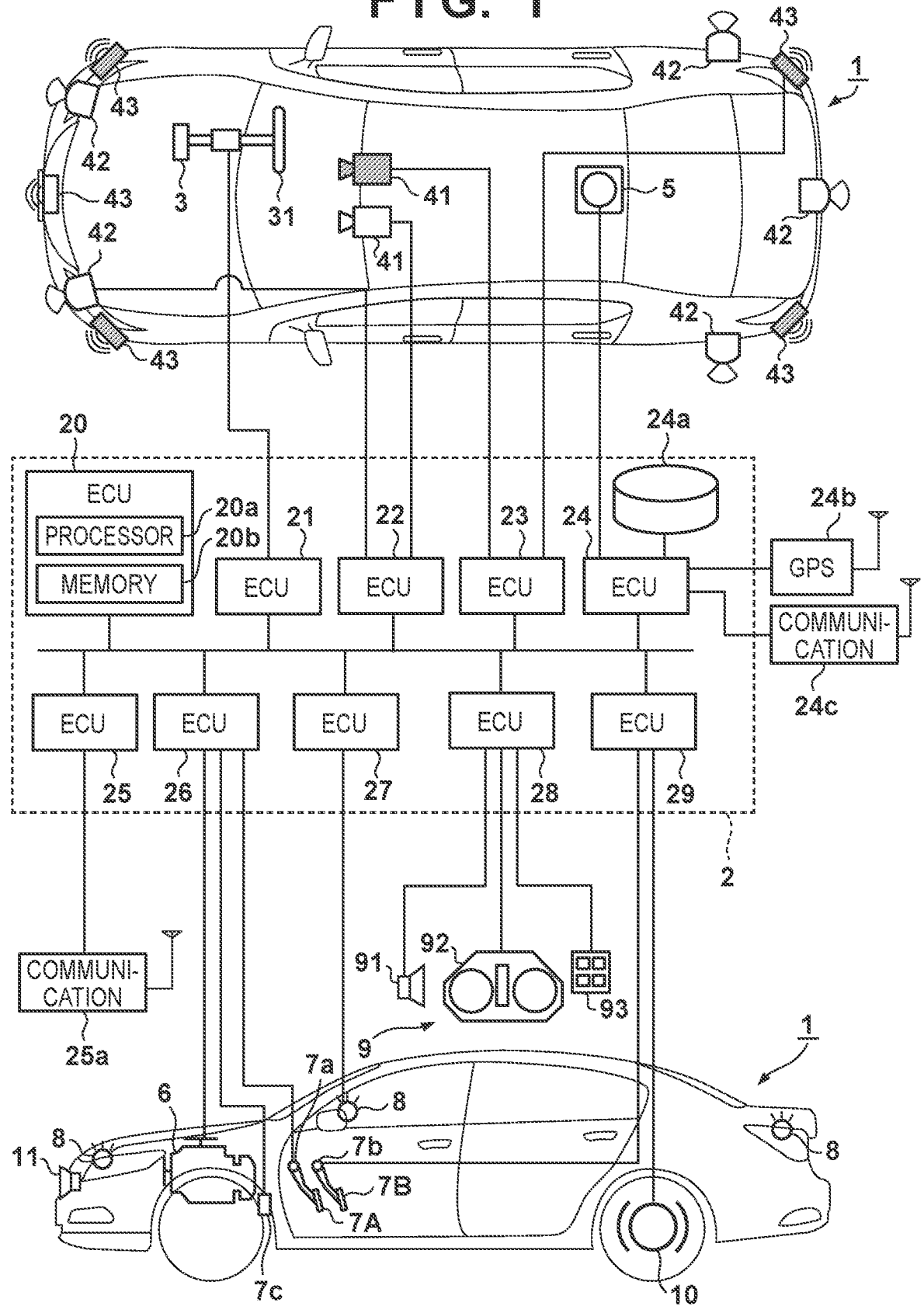
FIG. 1 is a block diagram for describing an example of a configuration of a vehicle according to an embodiment.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

A vehicle 1 includes a vehicle control device 2 (hereinafter, simply referred to as a control device 2) that controls the vehicle 1. The control device 2 includes a plurality of electronic control units (ECUs) 20 to 29 communicably connected by an in-vehicle network. Each ECU includes a processor represented by a central processing unit (CPU), a memory such as a semiconductor memory, an interface with an external device, and the like. The memory stores programs executed by the processor, data used for processing by the processor, and the like. Each ECU may include a plurality of processors, memories, interfaces, and the like. For example, the ECU 20 includes a processor 20a and a memory 20b. Processing by the ECU 20 is executed by the processor 20a executing a command included in the program stored in the memory 20b. Alternatively, the ECU 20 may include a dedicated integrated circuit such as an application-specific integrated circuit (ASIC) for executing processing by the ECU 20. The same applies to other ECUs.

Hereinafter, functions and the like assigned to each of the ECUs 20 to 29 will be described. Note that the number of ECUs and the functions assigned to the ECUs can be designed as appropriate and can be subdivided or integrated as compared with the present embodiment.

The ECU 20 performs a traveling control related to an automated driving function and a remote driving function of the vehicle 1. In the traveling control, the ECU 20 automatically controls steering and/or acceleration/deceleration of the vehicle 1. The automated driving function is a function in which the ECU 20 plans a travel route of the vehicle 1 and controls steering and/or acceleration/deceleration of the vehicle 1 based on the travel route. The remote driving function is a function in which the ECU 20 controls steering and/or acceleration/deceleration of the vehicle 1 in accordance with an instruction from an operator outside the vehicle 1. The operator outside the vehicle 1 may be a person or artificial intelligence (AI). The ECU 20 can also execute the automated driving function and the remote driving function in combination. For example, the ECU 20 may perform the traveling control by planning the travel route while there is no instruction from the operator, and when there is an instruction from the operator, the ECU 20 may perform the traveling control according to the instruction.

The ECU 21 controls an electric power steering device 3. The electric power steering device 3 includes a mechanism that steers a front wheel according to a driver's driving operation (steering operation) on a steering wheel 31. In addition, the electric power steering device 3 includes a motor that exerts a driving force for assisting the steering operation and automatically steering the front wheel, a sensor that detects a steering angle, and the like. When a driving state of the vehicle 1 is an automated driving state, the ECU 21 automatically controls the electric power steering device 3 according to an instruction from the ECU 20 and controls a traveling direction of the vehicle 1.

The ECUs 22 and 23 control detection units 41 to 43 that detect a situation outside the vehicle and execute information processing on a detection result. The detection unit 41 is a camera that captures an image of the front of the vehicle 1 (hereinafter, referred to as a camera 41) and is attached to the vehicle interior side of the windshield at the front of the roof of the vehicle 1 in the present embodiment. By analyzing the image captured by the camera 41, it is possible to extract a contour of an object or extract a division line (white line or the like) of a lane on a road.

The detection unit 42 is a light detection and ranging (lidar) (hereinafter, it may be referred to as a lidar 42), detects an object around the vehicle 1, and measures a distance to the object. In the present embodiment, five lidars 42 are provided, one at each corner portion of a front portion of the vehicle 1, one at the center of a rear portion of the vehicle 1, and one at each side of the rear portion of the vehicle 1. The detection unit 43 is a millimeter-wave radar (hereinafter, it may be referred to as a radar 43), detects an object around the vehicle 1, and measures a distance to the object. In the present embodiment, five radars 43 are provided, one at the center of the front portion of the vehicle 1, one at each corner portion of the front portion of the vehicle 1, and one at each corner portion of the rear portion of the vehicle 1.

The ECU 22 controls one camera 41 and each lidar 42 and executes information processing on the detection result. The ECU 23 controls the other camera 41 and each radar 43 and executes information processing on the detection result. Since two sets of devices for detecting the surrounding situation of the vehicle are provided, the reliability of the detection result can be improved, and since different types of detection units such as a camera, a lidar, and a radar are provided, the surrounding environment of the vehicle can be analyzed in multiple ways.

The ECU 24 controls a gyro sensor 5, a global positioning system (GPS) sensor 24*b*, and a communication device 24*c* and executes information processing on a detection result or a communication result. The gyro sensor 5 detects a rotational motion of the vehicle 1. The course of the vehicle 1 can be determined based on the detection result of the gyro sensor 5, the wheel speed, and the like. The GPS sensor 24*b* detects the current position of the vehicle 1. The communication device 24*c* performs wireless communication with a server that provides map information and traffic information and acquires these pieces of information. The ECU 24 can access a map information database 24*a* constructed in the memory, and the ECU 24 searches for a route from the current position to a destination and the like. The ECU 24, the map database 24*a*, and the GPS sensor 24*b* constitute a so-called navigation device.

The ECU 25 includes a communication device 25*a* for vehicle-to-vehicle communication. The communication device 25*a* performs wireless communication with other surrounding vehicles to exchange information between the vehicles. The communication device 25*a* is also used for communication with an operator outside the vehicle 1.

The ECU 26 controls a power plant 6. The power plant 6 is a mechanism that outputs a driving force for rotating driving wheels of the vehicle 1 and includes, for example, an engine and a transmission. For example, the ECU 26 controls the output of the engine according to the driving operation (accelerator operation or acceleration operation) of the driver detected by an operation detection sensor 7*a* provided on an accelerator pedal 7A and switches the gear ratio of the transmission based on information such as a vehicle speed detected by a vehicle speed sensor 7*c*. When the driving state of the vehicle 1 is the automated driving state, the ECU 26 automatically controls the power plant 6 according to an instruction from the ECU 20 and controls the acceleration and deceleration of the vehicle 1.

The ECU 27 controls lighting devices 8 (lamps such as headlight and taillight) including direction indicators (directional signals). In the example of FIG. 1, the lighting devices 8 are provided at the front portion, door mirrors, and the rear portion of the vehicle 1. The ECU 27 further controls a sound device 11 facing the outside of the vehicle, including a horn. The lighting device 8, the sound device 11, or a combination thereof has a function of providing information to the outside of the vehicle 1.

The ECU 28 controls an input/output device 9. The input/output device 9 outputs information to the driver and receives an input of information from the driver. A sound output device 91 notifies the driver of information by sound. A display device 92 notifies the driver of information by displaying an image. The display device 92 is arranged, for example, in front of a driver's seat and constitutes an instrument panel or the like. Note that, although the sound and the image display have been exemplified here, information notification may also be made by using vibration or light. In addition, information notification may be made by using a combination of some of the sound, image display, vibration, and light. Furthermore, the combination or the notification mode may vary in accordance with the level (for example, the degree of urgency) of information notification of which should be made. An input device 93 is a switch group that is arranged at a position where the driver can operate it and is used to input an instruction to the vehicle 1. The input device 93 may also include a sound input device. The ECU 28 can perform guidance related to the traveling control of the ECU 20. Details of the guidance will be described later. The input device 93 may include a switch used to control an operation of the traveling control performed by the ECU 20. The input device 93 may include a camera for detecting a line-of-sight direction of the driver.

The ECU 29 controls a brake device 10 and a parking brake (not illustrated). The brake device 10 is, for example, a disc brake device, and is provided on each wheel of the vehicle 1 to decelerate or stop the vehicle 1 by applying resistance to the rotation of the wheel. The ECU 29 controls the operation of the brake device 10 according to the driver's driving operation (brake operation) detected by an operation detection sensor 7*b* provided on a brake pedal 7B, for example. When the driving state of the vehicle 1 is the automated driving state, the ECU 29 automatically controls the brake device 10 according to an instruction from the ECU 20 and controls the deceleration and stop of the vehicle 1. The brake device 10 and the parking brake can also be operated to maintain a stopped state of the vehicle 1. In addition, in a case where the transmission of the power plant 6 includes a parking lock mechanism, the parking lock mechanism can also be operated to maintain the stopped state of the vehicle 1.

A configuration of a remote driving device 200 according to some embodiments of the present disclosure will be described with reference to a block diagram of FIG. 2. The remote driving device 200 is a device for providing a remote driving service to a vehicle having the remote driving function. The remote driving device 200 is located away from the service providing target vehicle.

The remote driving device 200 may be capable of providing the remote driving service in a plurality of operation modes. The plurality of operation modes of the remote driving service may include a leading mode and an assisting mode. The leading mode is an operation mode in which the operator of the remote driving device 200 specifies a control amount (for example, a steering angle, an accelerator pedal position, a brake pedal position, a position of a directional signal lever, or on/off of a light) of the vehicle. The assisting mode is an operation mode in which the vehicle (specifically, the ECU 20) determines a control amount of the vehicle in accordance with a path plan specified by the operator of the remote driving device 200. In the assisting mode, the operator of the remote driving device 200 may generate and specify the path plan by himself/herself, or may specify the path plan by adopting a path plan suggested by the vehicle.

Figure 2:
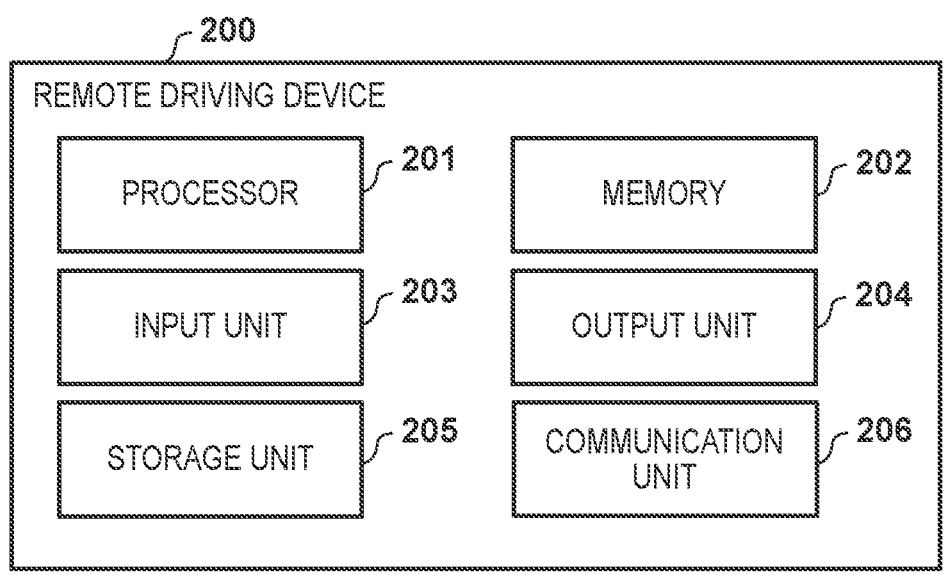
FIG. 2 is a block diagram for describing an example of a configuration of a remote driving device according to the embodiment.

The remote driving device 200 includes each component illustrated in FIG. 2. A processor 201 controls the overall operation of the remote driving device 200. The processor 201 functions as, for example, a CPU. A memory 202 stores programs, temporary data, and the like used for the operation of the remote driving device 200. The memory 202 is implemented by, for example, a ROM or a RAM. An input unit 203 is used by a user of the remote driving device 200 to make an input to the remote driving device 200. The user of the remote driving device 200 is a person who is an operation subject, or is a person (observer) who monitors an operation of AI in a case where the AI is the operation subject. An output unit 204 is used to output information from the remote driving device 200 to the user. A storage unit 205 stores data used for the operation of the remote driving device 200. The storage unit 205 is implemented by a storage device such as a disk drive (for example, HDD or SSD). A communication unit 206 provides a function for the remote driving device 200 to communicate with other devices (for example, a vehicle to be remotely driven), and is implemented by, for example, a network card, an antenna, or the like.

Figure 3:
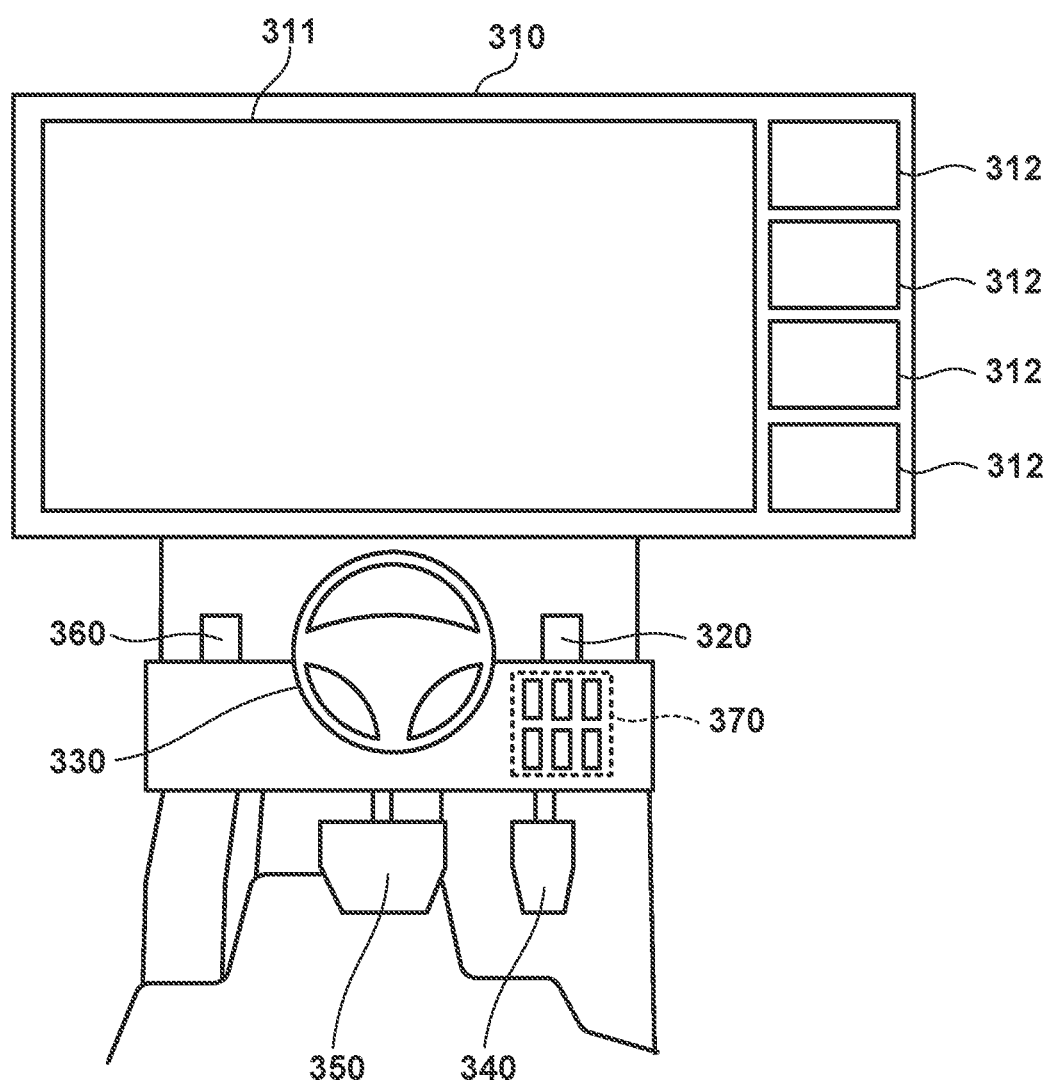
FIG. 3 is a schematic diagram for describing an example of a console for remote driving according to the embodiment.

An example of a configuration of the input unit 203 and the output unit 204 of the remote driving device 200 will be described with reference to the schematic diagram of FIG. 3. In this configuration example, the output unit 204 is implemented by a display device 310 and a sound device 320, and the input unit 203 is implemented by a steering wheel 330, an accelerator pedal 340, a brake pedal 350, a microphone 360, and a plurality of switches 370.

The display device 310 is a device that outputs visual information for providing the remote driving service. The sound device 320 is a device that outputs auditory information for providing the remote driving service. A screen displayed on the display device 310 includes one main region 311 and a plurality of sub regions 312. In the main region 311, information regarding a control target vehicle among a plurality of vehicles to which the remote driving service is provided is displayed. The control target vehicle is a vehicle to which an instruction from the remote driving device 200 is transmitted. In each sub region 312, information regarding a vehicle other than the control target vehicle among the plurality of vehicles to which the remote driving service is provided is displayed. The vehicle other than the control target vehicle may be referred to as a monitoring target vehicle. In a case where the remote driving service is provided to a plurality of vehicles by one remote driving device 200, the operator appropriately switches the vehicle (that is, the control target vehicle) displayed in the main region 311. The information displayed in the main region 311 and the sub region 312 includes a traffic condition around the vehicle, the speed of the vehicle, and the like.

The steering wheel 330 is used to control the steering amount of the control target vehicle in the leading mode. The accelerator pedal 340 is used to control the accelerator pedal position of the control target vehicle in the leading mode. The brake pedal 350 is used to control the brake pedal position of the control target vehicle in the leading mode. The microphone 360 is used to input voice information. The voice information input to the microphone 360 may be transmitted to the control target vehicle and reproduced in the vehicle.

The plurality of switches 370 are used to perform various inputs for providing the remote driving service. For example, the plurality of switches 370 include a switch for switching the control target vehicle, a switch for instructing a determination result of the operator in the assisting mode, a switch for switching a plurality of operation modes, and the like.

The remote driving device 200 described with reference to FIGS. 2 and 3 can provide both the leading mode and the assisting mode. Alternatively, the remote driving device 200 may be capable of providing only one of the leading mode and the support mode. In a case where the leading mode is not provided, the steering wheel 330, the accelerator pedal 340, and the brake pedal 350 can be omitted. In addition, a plurality of remote driving devices 200 may cooperate to provide the remote driving service. In this case, the remote driving device 200 may be able to hand over the vehicle to which the service is provided to another remote driving device 200.

Figure 4:
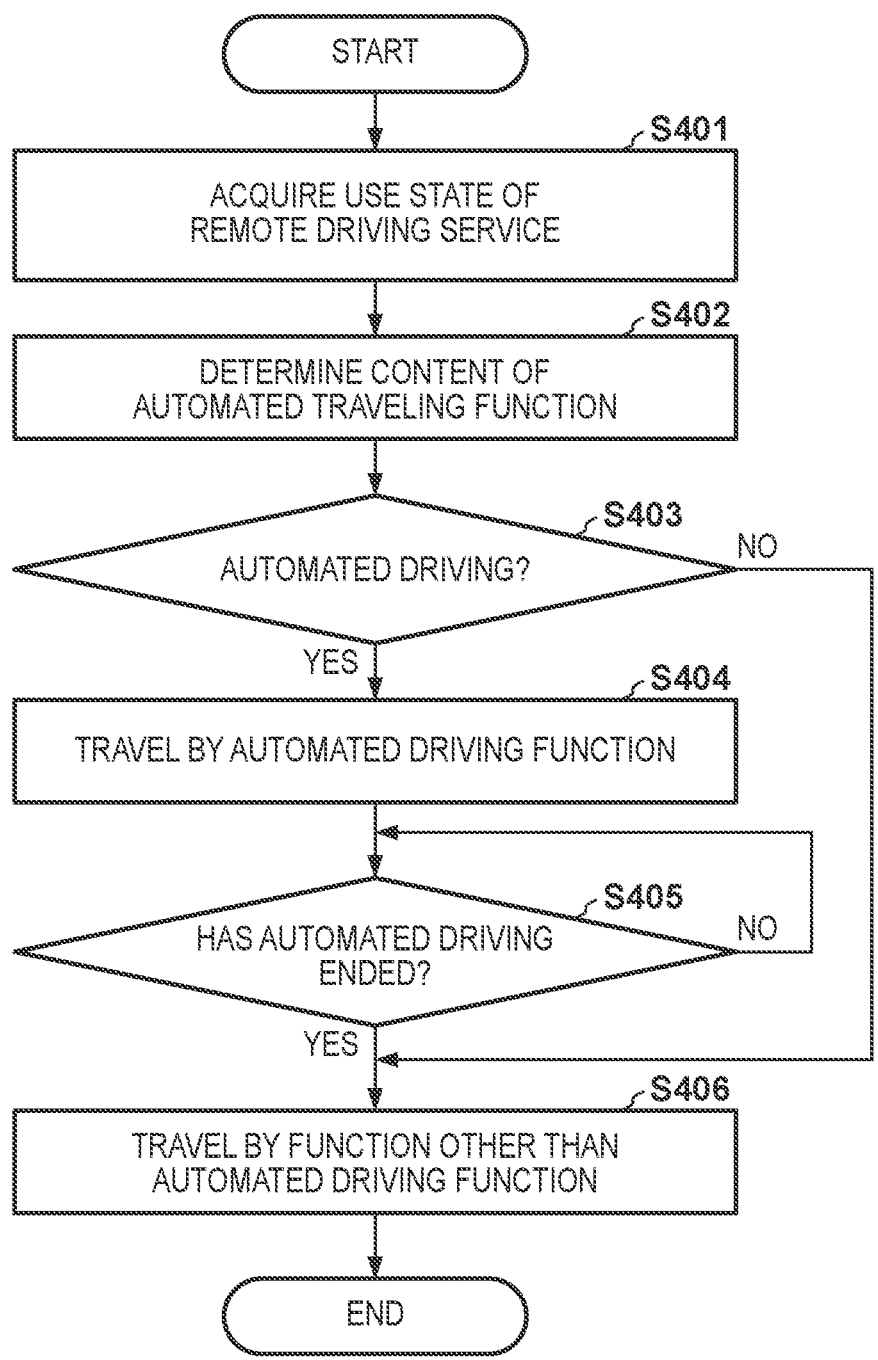
FIG. 4 is a flowchart for describing an example of a control method according to the embodiment.

A control method for the vehicle 1 executed by the control device 2 will be described with reference to FIG. 4. The control method may be executed by a processor (for example, the processor 20*a*) of the control device 2 executing a program stored in a memory (for example, the memory 20*b*). Alternatively, some or all of the steps of the method may be executed by a dedicated circuit such as an application-specific integrated circuit (ASIC). In the former case, the processor is a component for a specific operation, and in the latter case, the dedicated circuit is a component for a specific operation. The control method of FIG. 4 is repeatedly executed while the vehicle 1 is in operation. At the start of the control method of FIG. 4, the vehicle 1 may be stopped or traveling. In addition, the vehicle 1 may be being manually driven by the driver, may be being automatically driven by the control device 2, or may be being remotely driven by the remote driving device 200. A person who drives the vehicle 1 at the time of switching to manual driving (for example, a person sitting on the driver's seat) may be referred to as a "driver". It is assumed that the driver is not in a state unsuitable for the driving operation (that is, the driver is in a state suitable for the driving operation) during the execution of the control method of FIG. 4. Examples of the state unsuitable for the driving operation include being drunk, sleeping, and/or being stunned, having no driver's license, and/or not carrying a driver's license.

In step S401, the control device 2 acquires information regarding a use state of the remote driving service of the vehicle 1. In step S402, the control device 2 determines a content of an automated traveling function to be executable based on the use state of the remote driving service of the vehicle 1. For example, the control device 2 refers to a function determination table 500 illustrated in FIG. 5 to determine the content of the automated traveling function to be executable.

Figure 5:
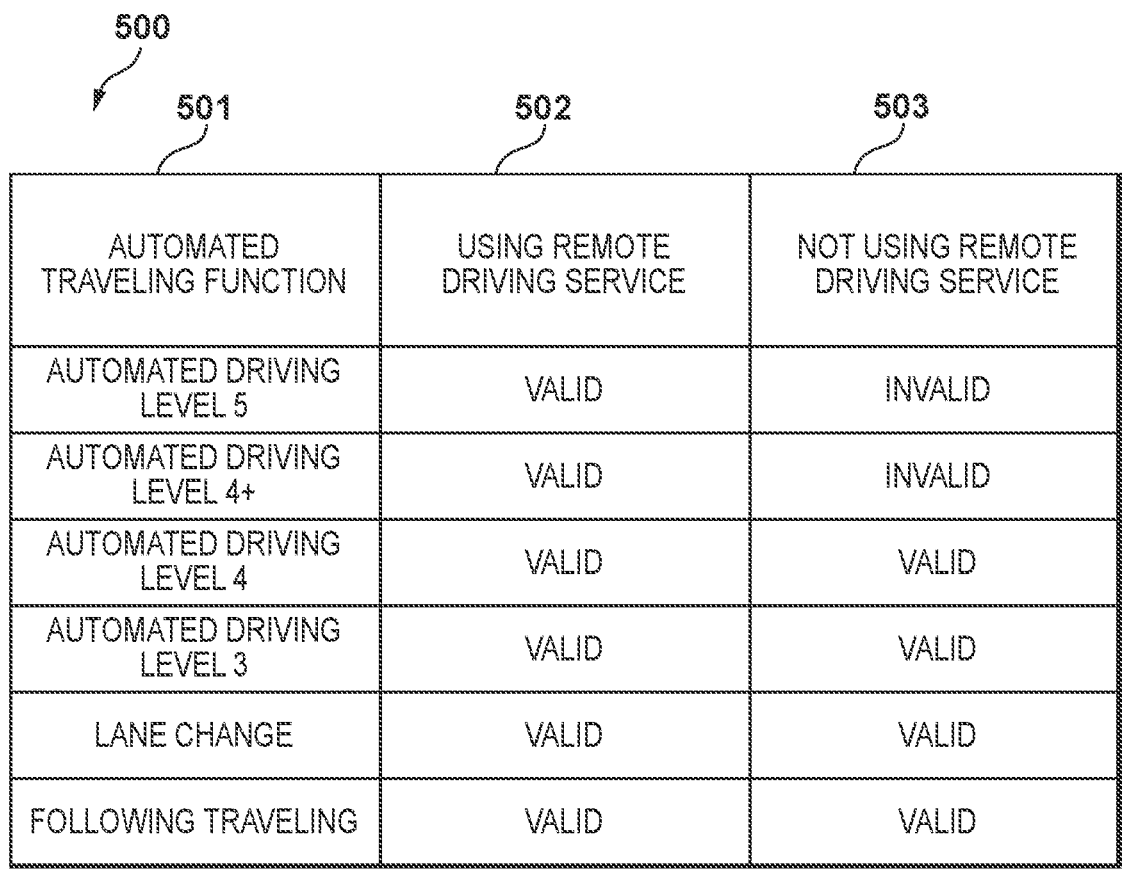
FIG. 5 is a diagram for describing an example of a function determination table according to the embodiment.

The function determination table 500 will be described with reference to FIG. 5. In the function determination table 500, the automated driving function to be executable varies based on whether or not the vehicle 1 is using the remote driving service. The state in which the remote driving service is in use may indicate a state in which the vehicle 1 can be operated by the operation subject of the remote driving device 200. Alternatively, the state in which the remote driving service is in use may indicate a state in which the operator of the remote driving device 200 can operate the vehicle 1 in the leading mode (the operation mode in which the operator of the remote driving device 200 specifies a control amount (for example, a steering angle, an accelerator pedal position, a brake pedal position, a position of a directional signal lever, or on/off of a light) of the vehicle). In any case, it is sufficient that the vehicle 1 can be operated by the operation subject of the remote driving device 200, and it does not matter whether or not the vehicle 1 is actually being remotely driven (operated).

Each column of the function determination table 500 will be described. A column 501 indicates the automated traveling functions provided by the vehicle 1. A column 502 indicates the automated driving functions to be executable when the vehicle 1 is using the remote driving service. A column 503 indicates the automated driving functions to be executable when the vehicle 1 is not using the remote driving service. In FIG. 5, a function that is "valid" is executable, and a function that is "invalid" is not executable.

The automated traveling functions of the column 501 will be described in detail. The control device 2 of the vehicle 1 (specifically, the ECU 20 for automated driving) has the automated traveling functions related to an automated driving level 5, an automated driving level 4+, an automated driving level 4, an automated driving level 3, a lane change, and following traveling, respectively. The automated driving levels 3, 4, and 5 may be categories defined by Society of Automotive Engineers (SAE). For example, the "automated driving level 3" represents a function of causing the vehicle 1 to perform all traveling controls except in emergencies. The "automated driving level 4" represents a function of causing the vehicle 1 to perform all traveling controls in a limited area even in emergencies. The "automated driving level 4+" represents a function obtained by adding a deadlock avoidance operation and an avoidance operation at the time of occurrence of an abnormality to the automated traveling function of the automated driving level 4. The "automated driving level 5" represents a function of causing the vehicle 1 to perform all traveling controls in all areas even in emergencies. The "lane change" represents a function of performing a lane change. The "following traveling" represents a function of following a preceding vehicle. As shown in the function determination table 500, when the vehicle 1 is not using the remote driving service, the control device 2 disables at least some of the automated traveling functions (the "automated driving level 5" and the "automated driving level 4+") that are executable when the vehicle 1 is using the remote driving service. When the remote driving service is in use, support by the operator can be expected, and thus execution of a high automated driving level is allowed. As described above, according to the control method of the present embodiment, the automated driving function of the vehicle 1 can be appropriately limited without being excessively limited.

In step S403, the control device 2 determines whether or not traveling using the automated driving function should be performed. In a case where the traveling using the automated driving function should be performed ("YES" in step S403), the control device 2 shifts the processing to step S404, and otherwise, the control device 2 shifts the processing to step S406. For example, the control device 2 may determine that the traveling using the automated driving function should be performed in a case where an instruction for execution of the automated driving function is received from the driver and the executable automated traveling control is equal to or higher than the automated driving level 3.

In step S404, the control device 2 performs the traveling using the automated driving function. In step S405, the control device 2 determines whether or not the traveling using the automated driving function should be ended. In a case where the traveling using the automated driving function should be ended ("YES" in step S405), the control device 2 shifts the processing to step S406, and otherwise ("NO" in step S405), the control device 2 repeats step S405. For example, in a case where it is necessary to make a determination by the operator of the remote driving device 200, the control device 2 determines that the traveling using the automated driving function should be ended when switching to remote driving is requested from the operator of the remote driving device 200.

In step S406, the control device 2 starts traveling using a function other than the automated driving function, for example, a manual driving function or a remote driving function.

Another control method for the vehicle 1 executed by the control device 2 will be described with reference to FIG. 6. An execution subject of the control method of FIG. 6 is similar to that of the control method of FIG. 4. In the control method of FIG. 6, a content of the automated traveling function to be executable is determined based on whether or not the driver of the vehicle 1 is in a state suitable for the driving operation in addition to the use state of the remote driving service for the vehicle 1.

In step S601, the control device 2 acquires information of the driver of the vehicle 1. The obtained information includes, for example, a state of the driver (including being awake, being drunk, sleeping, and/or being stunned), whether or not the driver has a driver's license, and/or carrying no driver's license. The state of the driver is detected based on, for example, an image of the driver captured by a vehicle compartment camera, biological information of the driver measured by a biological sensor (pulse, body temperature, alcohol component contained in sweat, and the like), and/or an alcohol concentration in the vehicle compartment detected using an alcohol odor sensor. For example, whether or not the driver has a driver's license is detected by means of personal identification based on the image of the driver captured by the vehicle compartment camera, and information regarding the driver's license status based on a database. At this time, it may be detected that the driver does not have a driver's license based on a determination that the driver is a child. For example, carrying no driver's license as the state of the driver is detected by an IC reader (sensor) that is carried by the driver or placed in the vehicle and is capable of reading IC chip information incorporated in the driver's license. Both of the camera and the sensor are mounted on the vehicle 1.

In step S602, the control device 2 determines whether or not the driver is unsuitable for the driving operation. In a case where the driver is unsuitable for the driving operation ("YES" in step S602), the control device 2 shifts the processing to step S604, and otherwise ("NO" in step S602), the control device 2 shifts the processing to step S603. A case where the driver is unsuitable for the driving operation includes, for example, being drunk, sleeping, and/or being stunned, having no driver's license, and/or carrying no driver's license.

In step S603, the control device 2 enables a manual operation by the driver. The manual operation by the driver includes performing the manual driving and making an instruction to the control device 2 during the automated driving. Step S603 is executed in a case where the driver is suitable for the driving operation. The control device 2 enables the driver to perform the manual operation since the driver is legally permitted to perform the operation and can normally perform the determination. In the present specification, "enabling a function" refers to maintaining a state where the function is available in a case where the function was available before the operation, and changing the state in a case where the function was unavailable before the operation. "Disabling a function" is the reverse thereof.

In step S604, the control device 2 disables the manual operation by the driver. Step S604 is executed in a case where the driver is unsuitable for the driving operation. In this case, the driver may perform an operation not legally permitted or an unintended operation on the vehicle 1. Therefore, the control device 2 does not receive an operation from the driver. For example, the control device 2 may fix the steering wheel 31, the accelerator pedal 7A, and the brake pedal 7B in order not to receive the operation, or may ignore an input therefrom.

In step S605, the control device 2 may notify the remote driving device 200 that is providing the remote driving service of the driver information detected in step S601. This information can be used by the operator of the remote driving device 200.

The processings subsequent to step S605 are similar to steps S401 to S406 in FIG. 4. Therefore, differences will be mainly described below. In step S402, the control device 2 determines the content of the automated traveling function to be executable based on the driver information and the use state of the remote driving service for the vehicle 1. For example, the control device 2 refers to a function determination table 700 illustrated in FIG. 7 to determine the content of the automated traveling function to be executable.

The function determination table 700 will be described with reference to FIG. 7. Similarly to the column 501, a column 701 indicates the automated traveling functions provided by the vehicle 1. A column 702 indicates the automated driving functions to be executable when the driver is suitable for the driving operation and the vehicle 1 is using the remote driving service. A column 703 indicates the automated driving functions to be executable when the driver is unsuitable for the driving operation and the vehicle 1 is using the remote driving service. A column 704 indicates the automated driving functions to be executable when the driver is suitable for the driving operation and the vehicle 1 is not using the remote driving service. A column 705 indicates the automated driving functions to be executable when the driver is unsuitable for the driving operation and the vehicle 1 is not using the remote driving service. In FIG. 7, a function that is "valid" is executable, and a function that is "invalid" is not executable.

In a case specified in the column 705, the control device 2 disables at least some (all in the example of FIG. 7) of the automated traveling functions that are executable in a case specified in the column 703. In a case specified in the column 704, the control device 2 disables at least some of the automated traveling functions that are executable in a case specified in the column 702. In a case specified in the column 705, the control device 2 disables each of at least some of the automated traveling functions that are executable in a case specified in the column 702, at least some of the automated traveling functions that are executable in a case specified in the column 703, and at least some of the automated traveling functions that are executable in a case specified in the column 704. In each of a case specified in the column 703, a case specified in the column 704, and a case specified in the column 705, the control device 2 disables at least some of the automated traveling functions that are executable in a case specified in the column 702. The automated traveling function that is executable in a case specified in the column 702 may be equal to the automated traveling function that is executable in a case specified in the column 703.

Generally, in a case where the driver is suitable for the driving operation, the control device 2 can execute many automated traveling functions as compared with a case where the driver is unsuitable for the driving operation. In addition, when the vehicle 1 is using the remote driving service, the control device 2 can execute many automated traveling functions as compared with a case where the vehicle 1 is not using the remote driving service. As described above, according to the control method of the present embodiment, the automated driving function of the vehicle 1 can be appropriately limited without being excessively limited.

In a case where the driver is unsuitable for the driving operation and the vehicle 1 is using the remote driving service in step S404, the vehicle 1 can execute the automated traveling function of the automated driving level 5 or the automated driving level 4+, and thus, the vehicle 1 can travel without executing the remote driving function by the remote driving service.

In step S406, when the driver is unsuitable for the driving operation and the vehicle 1 is using the remote driving service, the vehicle 1 cannot travel by the manual driving function. Therefore, when ending the automated traveling using the automated traveling function in this case, the vehicle 1 executes the remote driving function to travel.

Figure 8:
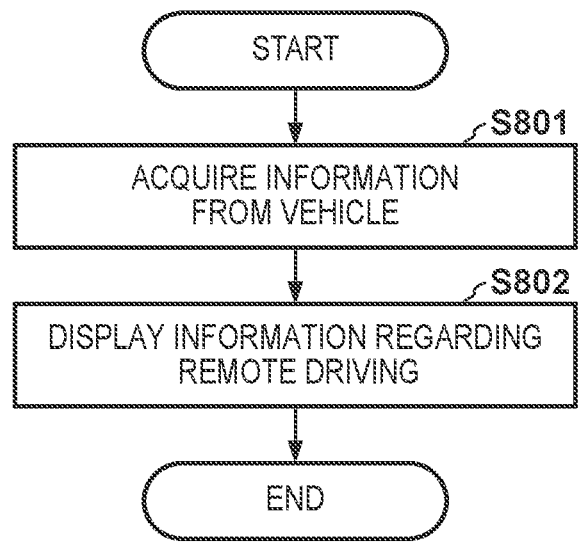
FIG. 8 is a flowchart for describing an example of a display control method according to the embodiment.

A display control method executed by the remote driving device 200 will be described with reference to FIG. 8. In this control method, the remote driving device 200 functions as a display control device. This control method may be executed by a processor of the remote driving device 200 executing a program stored in a memory. Alternatively, some or all of the steps of the method may be executed by a dedicated circuit such as an application-specific integrated circuit (ASIC). In the former case, the processor is a component for a specific operation, and in the latter case, the dedicated circuit is a component for a specific operation. The control method of FIG. 8 is repeatedly executed while the remote driving device 200 is providing the remote driving service.

In step S801, the remote driving device 200 acquires information to be used for providing the remote driving service from each of a plurality of service target vehicles 1. For example, this information is acquired by receiving information transmitted from the vehicle 1 via the communication network. This information may include information regarding the vehicle 1, for example, a current position, a communication state, a current speed, a surrounding traffic situation, a difficulty level of the automated traveling control, a planned travel route, the drive information notification of which is made in step S605, and the like.

In step S802, the remote driving device 200 displays information to be used by the operator to provide the remote driving service on the display device as the output unit 204. An example of the information displayed in step S802 will be described with reference to FIG. 9. As described above, the information regarding the vehicle to which the remote driving service is provided is displayed in the plurality of sub regions 312. The information displayed in the sub region 312 includes a vehicle ID, a vehicle speed, a difficulty level, communication quality, a current position, and driver information. The "vehicle ID" is an identifier for uniquely identifying the service providing target vehicle 1. The "vehicle speed" is the current speed of the vehicle 1. The "difficulty level" is the current difficulty level of the automated traveling control of the vehicle 1. In one example, the difficulty level is divided in three levels (A is the highest difficulty level), "A", "B", and "C", and displayed. This difficulty level may be a value determined by the vehicle 1 or a value determined by the remote driving device 200 based on information received from the vehicle 1. The "communication quality" is the current quality of communication of the communication device provided in the vehicle 1. The "driver" is the driver information described above. The current position is indicated by a circle on a map displayed in a region 900, for example.

Figure 9:
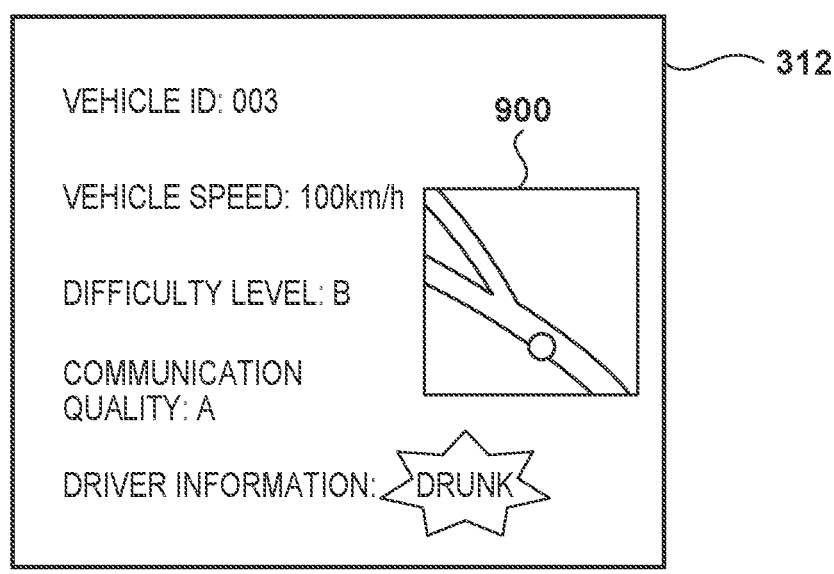
FIG. 9 is a schematic diagram for describing a display example according to the embodiment.

As illustrated in FIG. 9, the remote driving device 200 may highlight the driver information in a case where the driver is unsuitable for the driving operation. In the example of FIG. 9, the state is highlighted in a manner in which characters "drunk" indicating the driver information blinks. The highlighting method is not limited thereto. For example, the driver information may be displayed in a color different from that in a normal state, or the entire sub region 312 may be highlighted. As the driver information is highlighted in this manner, the operator of the remote driving device 200 can easily determine which vehicle the operator should watch out for.

In the above-described embodiment, the control device 2 of the vehicle 1 executes the control methods of FIGS. 4 and 6. Alternatively, the control methods of FIGS. 4 and 6 may be executed by a control device outside the vehicle 1. In this case, in step S601, the control device outside the vehicle 1 acquires the driver information acquired by the vehicle 1 by receiving the information from the vehicle 1. In step S606, the control device outside the vehicle 1 transmits an instruction to limit the automated driving function to the vehicle 1. In step S608, the control device outside the vehicle 1 transmits an instruction to enable the automated driving function to the vehicle 1.

Summary of Embodiment

Configuration 1

A control device (2) of a vehicle (1) including automated traveling means (20) capable of executing automated traveling functions, the control device including:
  acquisition means (S401) that acquires information regarding a use state of a remote driving service for the vehicle; and
  control means (S402) that determines a content of the automated traveling function to be executable by the automated traveling means based on the use state of the remote driving service for the vehicle,
  in which in a case where the vehicle is not using the remote driving service (503, 704, and 705), the control means disables at least some of the automated traveling functions that are executable in a case where the vehicle is using the remote driving service (502, 702, and 703).

With this configuration, the automated traveling function of the vehicle 1 can be appropriately limited without being excessively limited.

Configuration 2

The control device according to Configuration 1,
  in which the acquisition means further acquires information indicating whether or not a driver of the vehicle is in a state suitable for a driving operation (S601), and
  the control means determines the content of the automated traveling function to be executable by the automated traveling means based further on whether or not the driver is in a state suitable for the driving operation.

With this configuration, the automated traveling function can be more appropriately limited based on the state of the driver of the vehicle 1.

Configuration 3

The control device according to Configuration 2, in which in a case where the driver is unsuitable for the driving operation and the vehicle is not using the remote driving service (705), the control means disables at least some of the automated traveling functions that are executable in a case where the driver is unsuitable for the driving operation and the vehicle is using the remote driving service (703).

With this configuration, the automated traveling function can be appropriately limited in a case where the driver of the vehicle 1 is unsuitable for the driving operation.

Configuration 4

The control device according to Configuration 2 or 3, in which in a case where the driver is suitable for the driving operation and the vehicle is not using the remote driving service (704), the control means disables at least some of the automated traveling functions that are executable in a case where the driver is suitable for the driving operation and the vehicle is using the remote driving service (702).

With this configuration, the automated traveling function can be appropriately limited in a case where the driver of the vehicle 1 is suitable for the driving operation.

Configuration 5

The control device according to any one of Configurations 2 to 4, in which in a case where the driver is unsuitable for the driving operation and the vehicle is not using the remote driving service (705), the control means disables each of at least some of the automated traveling functions that are executable in a case where the driver is suitable for the driving operation and the remote driving service is in use (702), at least some of the automated traveling functions that are executable in a case where the driver is suitable for the driving operation and the remote driving service is not in use (704), and at least some of the automated traveling functions that are executable in a case where the driver is unsuitable for the driving operation and the remote driving service is in use (703).

With this configuration, the automated traveling function can be appropriately limited based on the state of the driver of the vehicle 1 and the use state of the remote driving service.

Configuration 6

The control device according to any one of configurations 2 to 5, in which in each of a case where the driver is suitable for the driving operation and the vehicle is not using the remote driving service (704), a case where the driver is unsuitable for the driving operation and the vehicle is using the remote driving service (703), and a case where the driver is unsuitable for the driving operation and the vehicle is not using the remote driving service (705), the control means disables at least some of the automated traveling functions that are executable in a case where the driver is suitable for the driving operation and the vehicle is using the remote driving service (702).

With this configuration, the automated traveling function can be appropriately limited based on the state of the driver of the vehicle 1 and the use state of the remote driving service.

Configuration 7

The control device according to any one of configurations 2 to 5, in which the automated traveling function that is executable in a case where the driver is suitable for the driving operation and the vehicle is using the remote driving service (702) is equal to the automated traveling function that is executable in a case where the driver is unsuitable for the driving operation and the vehicle is using the remote driving service (703).

With this configuration, in a case where the remote driving service is in use, the same automated traveling function can be provided regardless of the state of the driver.

Configuration 8

The control device according to any one of Configurations 2 to 7, in which the driver being unsuitable for the driving operation includes the driver being in a drunk state.

With this configuration, the automated traveling can be restricted in a case where the driver is in a drunk state.

Configuration 9

The control device according to any one of Configurations 2 to 8, in which the automated traveling means does not receive an operation from the driver in a case where the driver is unsuitable for the driving operation.

With this configuration, the operation by the driver unsuitable for the driving operation can be ignored.

Configuration 10

The control device according to any one of Configurations 2 to 9, in which the automated traveling means is capable of traveling by executing the automated traveling function without executing a remote driving function by the remote driving service in a case where the driver is unsuitable for the driving operation and the vehicle is using the remote driving service (S403).

With this configuration, even in a case where the driver is unsuitable for the driving operation, it is possible to cope with such a case.

Configuration 11

The control device according to Configuration 10, in which the automated traveling means executes the remote driving function by the remote driving service in a case where the driver is unsuitable for the driving operation and the automated traveling using the automated traveling function is ended (S406).

With this configuration, the automated driving switches to the remote driving after the end of the automated driving.

Configuration 12

The control device according to any one of Configurations 2 to 11, further including notification means (S605) that notifies a device (200) that provides the remote driving service of information indicating whether or not the driver is in a state suitable for the driving operation.

With this configuration, the operator of the remote driving device can grasp the driver information.

Configuration 13

A program for causing a computer to function as each means of the control device according to any one of Configurations 1 to 12.

With this configuration, the above configurations can be implemented in a form of a program.

Configuration 14

A control method for a vehicle (1) including automated traveling means (20) capable of executing automated traveling functions, the control method including:
  an acquisition step (S401) of acquiring information regarding a use state of a remote driving service for the vehicle; and
  a control step (S402) of determining a content of the automated traveling function to be executable by the automated traveling means based on the use state of the remote driving service for the vehicle,
  in which in the control step, in a case where the vehicle is not using the remote driving service (503, 704, and 705), at least some of the automated traveling functions that are executable in a case where the vehicle is using the remote driving service (502, 702, and 703) are disabled.

With this configuration, the automated traveling function of the vehicle 1 can be appropriately limited without being excessively limited.

The present invention is not limited to the above-described embodiment, and various changes and modifications can be made without departing from the spirit and scope of the present invention. Therefore, in order to make the scope of the present invention public, the following claims are attached.

What is claimed is:
1. A control device of a vehicle capable of executing automated traveling functions, the control device comprising at least one processor circuit and a memory comprising instructions, that when executed by the processor circuit, cause the processor circuit to at least:

acquire information regarding a use state of a remote driving service for the vehicle and information indicating whether or not a driver of the vehicle is in a state suitable for a driving operation; and in a case where the driver is suitable for the driving operation and the vehicle is not using the remote driving service, disable an automated traveling function related to an automated driving level 4+, the automated traveling function being executable in a case where the driver is not suitable for the driving operation and the vehicle is using the remote driving service.

2. The control device according to claim 1, wherein in a case where the driver is unsuitable for the driving operation and the vehicle is not using the remote driving service, the instructions cause the processor circuit to disable at least some of the automated traveling functions that are executable in a case where the driver is unsuitable for the driving operation and the vehicle is using the remote driving service.

3. The control device according to claim 1, wherein in a case where the driver is suitable for the driving operation and the vehicle is not using the remote driving service, the instructions cause the processor circuit to disable at least some of the automated traveling functions that are executable in a case where the driver is suitable for the driving operation and the vehicle is using the remote driving service.

4. The control device according to claim 1, wherein in a case where the driver is unsuitable for the driving operation and the vehicle is not using the remote driving service, the instructions cause the processor circuit to disable each of at least some of the automated traveling functions that are executable in a case where the driver is suitable for the driving operation and the remote driving service is in use, at least some of the automated traveling functions that are executable in a case where the driver is suitable for the driving operation and the remote driving service is not in use, and at least some of the automated traveling functions that are executable in a case where the driver is unsuitable for the driving operation and the remote driving service is in use.

5. The control device according to claim 1, wherein in each of a case where the driver is suitable for the driving operation and the vehicle is not using the remote driving service, a case where the driver is unsuitable for the driving operation and the vehicle is using the remote driving service, and a case where the driver is unsuitable for the driving operation and the vehicle is not using the remote driving service, the instructions cause the processor circuit to disable at least some of the automated traveling functions that are executable in a case where the driver is suitable for the driving operation and the vehicle is using the remote driving service.

6. The control device according to claim 1, wherein the automated traveling function that is executable in a case where the driver is suitable for the driving operation and the vehicle is using the remote driving service is equal to the automated traveling function that is executable in a case where the driver is unsuitable for the driving operation and the vehicle is using the remote driving service.

7. The control device according to claim 1, wherein the driver being unsuitable for the driving operation includes the driver being in a drunk state.

8. The control device according to claim 1, wherein the instructions cause the processor circuit not to receive an operation from the driver in a case where the driver is unsuitable for the driving operation.

9. The control device according to claim 1, wherein the vehicle is capable of traveling by executing the automated traveling function without executing a remote driving function by the remote driving service in a case where the driver is unsuitable for the driving operation and the vehicle is using the remote driving service.

10. The control device according to claim 9, wherein the vehicle executes the remote driving function by the remote driving service in a case where the driver is unsuitable for the driving operation and the automated traveling using the automated traveling function is ended.

11. The control device claim 1, wherein the instructions cause the processor circuit to notify a device that provides the remote driving service of information indicating whether or not the driver is in a state suitable for the driving operation.

12. A non-transitory storage medium comprising a program including instructions, that when executed by a processor circuit, cause the processor circuit to at least:

acquire information regarding a use state of a remote driving service for the vehicle and information indicating whether or not a driver of the vehicle is in a state suitable for a driving operation; and in a case where the driver is suitable for the driving operation and the vehicle is not using the remote driving service, disable at least some of the automated traveling functions that are executable in a case where the driver is not suitable for the driving operation and the vehicle is using the remote driving service.

13. A control method for a vehicle capable of executing automated traveling functions, the control method comprising:

acquiring information regarding a use state of a remote driving service for the vehicle; and in a case where a driver is suitable for the driving operation and the vehicle is not using the remote driving service, disabling an automated traveling function related to an automated driving level 4+, the automated traveling function being executable in a case where the driver is not suitable for the driving operation and the vehicle is using the remote driving service.

* * * * *